United States Patent [19]

Fukuyama et al.

[11] Patent Number: 4,631,465
[45] Date of Patent: Dec. 23, 1986

[54] TOOL DISPLAY SYSTEM OF AUTOMATIC TOOL CHANGING APPARATUS

[75] Inventors: Hiroomi Fukuyama, Hachioji; Kiyoshi Hattori, Shiroyama; Yoshihiro Nakashima, Machida, all of Japan

[73] Assignee: Fanuc Ltd, Minamitsuru, Japan

[21] Appl. No.: 766,839

[22] PCT Filed: Feb. 6, 1985

[86] PCT No.: PCT/JP85/00048
§ 371 Date: Jul. 31, 1985
§ 102(e) Date: Jul. 31, 1985

[87] PCT Pub. No.: WO85/03470
PCT Pub. Date: Aug. 15, 1985

[30] Foreign Application Priority Data

Feb. 6, 1984 [JP] Japan .................................. 59-019564

[51] Int. Cl.⁴ ............................................. G05B 23/02
[52] U.S. Cl. ..................................... 318/565; 318/569; 29/568; 340/680
[58] Field of Search ................... 318/565, 569; 29/568; 340/680; 364/474

[56] References Cited

U.S. PATENT DOCUMENTS 3,576,540  4/1971  Fair et al. ....................... 318/562 X
4,543,636  9/1985  Noda et al. ..................... 318/569 X
4,549,270 10/1985  Fukumara et al. ............... 29/568 X

FOREIGN PATENT DOCUMENTS 0129091 12/1984 European Pat. Off. ............ 318/565
0129092 12/1984 European Pat. Off. ............ 318/565
0155606  9/1982 Japan ................................. 318/565

Primary Examiner—B. Dobeck
Attorney, Agent, or Firm—Staas & Halsey

[57] ABSTRACT

A tool display system of an automatic tool changing apparatus (31) in a machine tool (30) sequentially controlled by a programmable controller (20) on the basis of a control signal from a numerical control unit (1). The tool display system is equipped with a memory (21) for storing the positions of a plurality of pots (31b) provided on a tool magazine (31a) accommodating tools, and a display unit (14) for displaying the tool information stored in the memory (21). The display unit (14) displays a graphic pattern representing the positions of the plurality of pots on the tool magazine (31a) as well as the present positions of tools accommodated in the tool magazine, the latter appearing inside the graphic pattern.

5 Claims, 3 Drawing Figures

| | | | | |
|---|---|---|---|---|
| 0 | SPINDLE | | T17 | (T03) |
| 1 | POT | 1 | T01 | |
| 2 | POT | 2 | T02 | |
| 3 | POT | 3 | T03 | (T17) |
| 4 | POT | 4 | T04 | |
| 5 | POT | 5 | T05 | |
| 6 | POT | 6 | T06 | |
| 7 | POT | 7 | T07 | |
| ⋮ | | ⋮ | | ⋮ |
| 14 | POT | 14 | T14 | |
| 15 | POT | 15 | T15 | |
| 16 | POT | 16 | T16 | |

\* ↓ (at row 3)

POT POSITION
SPINDLE POSITION

TOOL DISPLAY SYSTEM OF AUTOMATIC TOOL CHANGING APPARATUS

DESCRIPTION

1. Technical Field

This invention relates to a tool display system of an automatic tool changing apparatus in a machine tool controlled by a numerical control unit. More particularly, the invention relates to a tool display system of an automatic tool changing apparatus in which tools are changed by way of a random method.

2. Background Art

Numerically controlled machine tools in which a machine tool is controlled by a numerical control unit have come into wide use in recent years. These numerically controlled machine tools include ones equipped with an automatic tool changing apparatus (hereafter referred to as an ATC apparatus) for automatically changing tools mounted on a spindle. The ATC apparatus is equipped with a tool magazine accommodating a plurality of tools and is adapted to select a tool designated by the numerical control unit to automatically change the tool mounted on the spindle. Two methods of changing tools in an ATC apparatus are available. One method is a sequential method in which the tool magazine accommodates tools in the order used. The other method is a random method in which tools necessary for machining are accommodated in the tool magazine, the tool magazine is moved to index a tool, necessary for machining, to a tool change position and this tool is exchanged directly for the one on the spindle; or in which tools to be used are accommodated in a prescribed tool magazine. The tool magazine is moved to index a tool, necessary for machining, to a tool change position. This tool is mounted on the spindle and the tool from the spindle is received at its original position in the tool magazine. Many ATC apparatus of recent numerically controlled machine tools employ this random method. In a first type of the ATC apparatus that employs the random method, a tool withdrawn from the spindle is received in the tool magazine at a position left vacant by a tool extracted from the magazine in order to be mounted on the spindle. For this reason, the arrangement of the tools accommodated in the tool magazine changes each time a tool change is performed. Meanwhile, the changing tool position is stored in memory beforehand on the numerical control unit (hereafter referred to as an NC unit) side or programmable controller (hereafter referred to as a PC unit) side to avoid impeding the machine tool control operation. However, in cases where such activities as tool inspection and servicing are carried out, the operator is sometimes confused by the fact that a tool is not located at the position where it was initially set. Moreover, in order to ascertain the present position of a tool, the tools accommodated in the tool magazine must be visually identified. Though the other configuration of the ATC apparatus employing the random method does not possess the foregoing disadvantages, tools are not received in the magazine in the order in which they are used. This is a troublesome arrangement because the operator must visually confirm the tool accommodating position and the tool that is in use.

SUMMARY OF THE PRESENT INVENTION

The present invention has been devised to eliminate the aforementioned drawbacks of the prior art. An object is to provide a tool display system of an ATC apparatus wherein the positions of tool magazine pots for accommodating tools and the tool numbers of the tools accommodated in the pots are displayed on a display unit.

According to the present invention, there is provided a tool display system of an ATC apparatus in a numerically controlled machine tool having a machine tool equipped with the ATC apparatus, an NC unit for executing numerical control of the machine tool, and a programmable controller for executing sequential control of the machine tool on the basis of a control signal from the NC unit. The system is equipped with a memory for storing tool information relating to a plurality of pots provided in the tool magazine of the ATC apparatus and to a plurality of tools accommodated in the plurality of pots, and a display unit for displaying the tool information stored in the memory. The programmable controller rewrites the tool information in the memory on the basis of a tool change command produced as an output by the NC unit. The display unit displays a graphic pattern analogous to the positions of the plurality of pots provided on the tool magazine, as well as the present position of the tools on the basis of the tool information stored in the memory, the tool positions appearing inside the graphic pattern.

Thus, according to the tool display system of the present invention, a graphic pattern analogous to the positions of the plurality of pots provided in the tool magazine of the ATC aparatus is displayed on the display unit. The present positions of the tools accommodated in the plural pots are displayed inside the graphic pattern. As a result, the operator can immediately ascertain the present position of a tool merely by looking at the display unit. This enables operations such as tool servicing and inspection to be performed very efficiently.

BRIEF DESCRIPTION OF THE PREFERRED EMBODIMENT

The present invention will now be described in detail based on the embodiment in FIG. 1.

Figure 1:
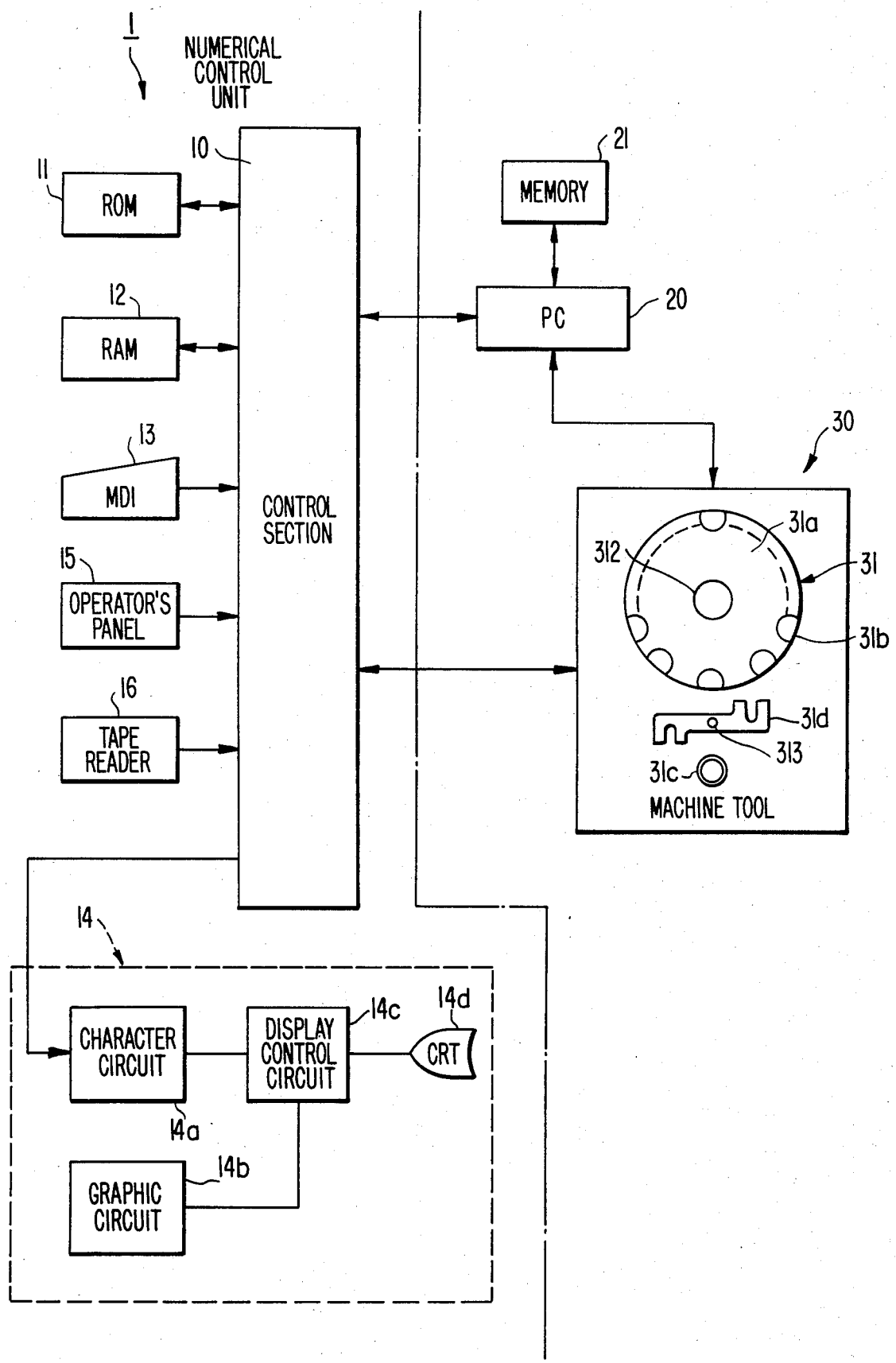
FIG. 1 is a block diagram of an embodiment of a numerical control system of the present invention.

FIG. 1 is a block diagram of an embodiment of a numerical control system of a machine tool equipped with an ATC apparatus for practicing the present invention. In FIG. 1, numeral 1 denotes a numerical control (NC) unit. The NC unit 1 has a control section 10 that includes a central processor, a read-only memory (ROM) 11, a random-access memory (RAM) 12, a data input unit (MDI) 13, a display unit 14, an operator's panel 15, a data reader 16 for reading, e.g., a tape bearing a punched part program, and the like.

The control section 10 performs predetermined processing based on each of the instructions in a part program or control program, which is described below. The ROM 11 stores various control programs to be run by the control section 10. The RAM 12 temporarily stores a part program input from the tape reader 16 or the like, the results of calculations performed by the control section 10, as well as data. The data input unit (MDI) 13 has various keys such as numeric keys and function keys and supplies the NC unit with various data applied from the outside. The display unit 14 has a character circuit 14a, a graphic circuit 14b, a display control circuit 14c and a CRT display (CRT) 14d. According to the present invention, in addition to displaying data entered from the data input unit 13 as well as the present positions of tools, the display unit 14 displays the tool magazine of the machine tool and the present positions of tools accommodated in the magazine. The details will be described hereinbelow. With an ordinary NC unit, the data input unit 13 and display unit 14 are combined into a single unit. However, in order to facilitate the explanation, they are described as separate entities in the present embodiment.

Numeral 20 denotes a PC unit having the configuration of a computer which includes a central processor. The PC unit is programmed to perform the function of a magnetics circuit that controls the sequence of a machine tool 30. The PC unit 20 has a memory 21 for storing a control program which controls the PC unit, a sequence program for controlling the machine tool 30, the results of calculations, various data transmitted by the control section 10 and machine tool 30, the pot positions on the tool magazine of an ATC apparatus (described below) provided on the machine tool 30, and the numbers of the tools accommodated in the tool magazine.

The machine tool 30 is provided with an ATC apparatus 31. The ATC apparatus 31 includes a tool magazine 31a suitably rotated by a drive mechanism and having on its periphery a plurality of pots 31b for accommodating tools, and a tool changing arm 31d for exchanging a tool accommodated by the tool magazine 31a for a tool mounted in a spindle 31c of the machine tool. When a tool in use on the spindle 31c is to be exchanged for another tool by the ATC apparatus 31, indexing is performed to rotate the tool magazine 31a about a shaft 312 to bring a pot 31b accommodating the new tool to a point directly above the spindle 31c. Next, the tool changing arm 31d is swung counterclockwise about a shaft 313 and simultaneously grasps and withdraws the new tool indexed into position and the used tool mounted on the spindle 31c. Thereafter, the tool changing arm is rotated 180° about the shaft 313, the used tool withdrawn from the spindle 31c is received in the tool magazine 31a at a vacant pot 31b which previously accommodated the new tool, and the new tool is mounted on the spindle 31c.

The arrangement is such that the memory 21 provided in the PC unit 20 stores the correlation between the positions of the pots 31b provided in the tool magazine 31a and the numbers of the tools accommodated in the magazine.

Figures 2, 3:
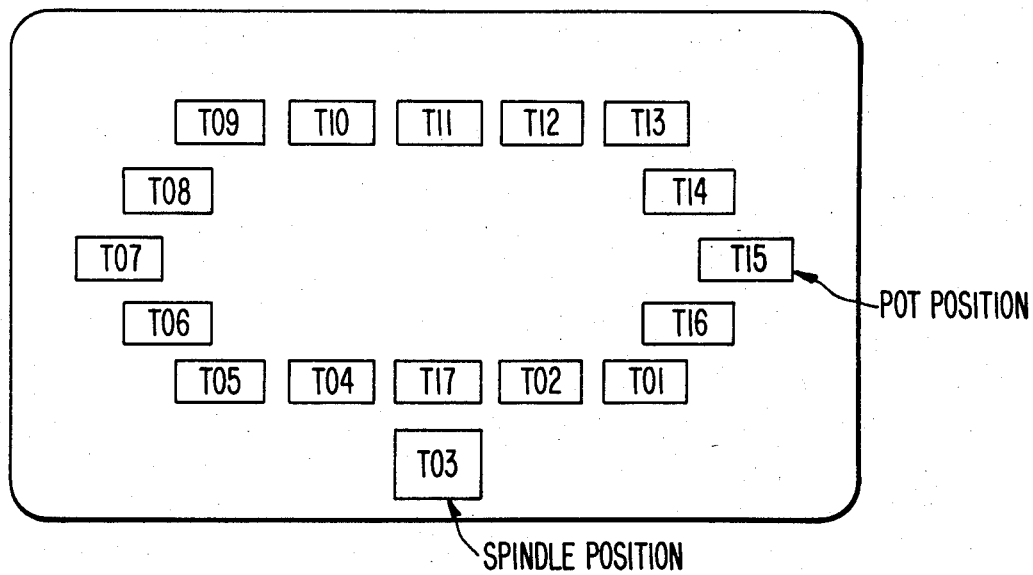
FIG. 2 is a view showing the contents of a memory storing the correlation between a plurality of tools accommodated in the tool magazine of an ATC apparatus and the positions at which the tools are accommodated.
FIG. 3 is illustrating an embodiment of a display unit.

FIG. 2 illustrates the contents stored in the memory. In FIG. 2, the address 0 is an area for storing the number of a tool mounted in the spindle 31c. The addresses from 1 to 16 are areas for storing pot numbers and the numbers of tools accommodated in these pots.

The operation of the above embodiment will be described next.

When one block of an activity is completed in the machine tool 30, the control section 10 of the NC unit 1 reads one block of part of a program for the next activity out of the RAM 12. If the block contains a tool change command (M06) and the number (T□□) of a new tool to be exchanged for the old, the control section 10 sends a tool change command and the number of the new tool to be exchanged for the old tool to the PC unit 20. A tool change operation is initiated on the side of the PC unit 20 on the basis of the tool change command. Assume that the number of the new tool to be exchanged for the old tool is T03. In such a case, the PC unit 20 performs a search sequentially starting from address 1 of the memory 21 and senses that the tool having the above-mentioned number is accommodated at pot number 3, which is registered at address 3. On the basis of the tool number, the PC unit 20 determines whether pot 31b accommodating the requested tool is on the forward or reverse rotation side of the tool magazine 31a. The direction in which the tool magazine 31a is to be rotated is decided in accordance with the results of the determination. A drive mechanism, not shown, is subsequently set into operation to rotatively index the tool magazine 31a so as to bring the No. 3 pot into position above the spindle 31c. Let us assume that a used tool T17 is the tool located in the spindle 31c at this time. Under these conditions, the ATC apparatus 31 operates the tool changing arm 31d as described above to withdraw the tool T17 mounted in the spindle 31c as well as the tool T03 accommodated in pot No. 3 of the tool magazine 31a, mount the tool T03 on the spindle 31c and place the used tool T17 in port No. 3 of the tool magazine 31a, thereby ending the tool change operation on the machine tool side.

In parallel with this tool change operation performed on the machine tool side, the tool numbers at addresses 0 and 3 of the memory 21 are rewritten on the side of the PC unit 20. More specifically, the PC unit 20 writes T03 into memory 21 at address 0 and T17 into memory 21 at address 3. Thereafter, the PC unit 20 goes to the memory 21 to read the number T03 of the tool mounted in spindle 31c and then reads out the tool numbers successively starting with the number of the tool accommodated at the pot number directly above the spindle 31c (i.e., reads out tool numbers in the direction of the larger addresses starting from the asterisk mark in FIG. 2, returns from address 16 to address 1 and then reads out tool numbers up to address 2). The PC 20 transmits the information relating to these tools to the control section 10 of NC unit 1.

Meanwhile, the control section 10 of NC unit 1 sends a command to the display unit 14 in response to the tool change command M06, whereby the display unit is commanded to perform an operation for displaying the present positions of the tools accommodated in the tool magazine of the machine tool. In response to the command, the display unit 14 displays, on the CRT 14d, a graphic pattern representing the positions of the pots provided on the tool magazine 31a and a graphic pattern (the rectangular pattern in FIG. 3) representing the position of the spindle, these graphic patterns being produced as outputs by the graphic circuit 14b. Next, on the basis of the tool information transmitted by the PC unit 20, the control section 10 provides the display unit 14 with tool numbers read successively starting from address 3, the number of the tool mounted in the spindle 31c being first. The character circuit 14a of the display unit 14 supplies the display controller 14c with the character codes corresponding to these tool numbers, and the display controller 14c assigns these numbers to the graphic patterns. The CRT 14d displays the present position numbers of the tools disposed at the pots and spindles, as shown in FIG. 3.

Though the above-described embodiment is so arranged as to display only the tool numbers on the CRT 14d, it is also possible to read out the pot numbers at the same time that data relating to the tools are read out of the memory 21, and to display the pot numbers together with the tool numbers.

Further, in the above-described embodiment, the PC unit is provided with an internal memory for storing the correlation between the plurality of tools mounted on the ATC apparatus and the positions at which the tools are accommodated. However, the memory may just as well be provided on the side of the NC unit 1. Alternatively, a vacant area in the RAM 12 of the NC unit 1 may be utilized.

As set forth above, the present invention is arranged in such a manner that the present positions of tools accommodated in a tool magazine of an ATC apparatus in a numerically controlled machine tool are displayed inside a graphic pattern analogous to the pot positions of a tool magazine. Accordingly, the operator can immediately ascertain the present positions of the tools merely by observing the display unit. The invention therefore is well-suited for application to numerically controlled machine tools which perform a series of machining operations while changing a number of tools.

It is possible for the present invention to be applied to a random access-type ATC apparatus other than that of the above-described embodiment. Such application can be accomplished through a simple method.

We claim:

1. A tool display system of an automatic tool changing apparatus having a machine tool equipped with an automatic tool changing apparatus, a numerical control unit for executing numerical control of the machine tool, and a programmable controller for executing sequential control of the machine tool on the basis of a control signal from said numerical control unit, said tool display system comprising:
   a tool magazine provided on the automatic tool changing apparatus;
   a plurality of pots, provided on said tool magazine, for accommodating tools;
   a memory, operatively connected to the machine tool, for storing the position of each of said plurality of pots and for storing position information for tools accommodated at the pot positions; and
   a display unit, operatively connected to the numerical control unit, for displaying pot positions, the pot positions changing due to movement of said tool magazine, and said tools accommodated at the pot positions, on the basis of said position information stored in said memory.

2. A tool display system of an automatic tool changing apparatus according to claim 1, wherein said tools are provided with numbers corresponding thereto, and wherein said display unit for displaying tool information comprises:
   a graphic circuit for producing a signal corresponding to a graphic pattern representing the positions of the pots provided on said tool magazine;
   a character circuit for producing character codes representing the tool numbers of said tools accommodated in said pots;
   a display control circuit, operatively connected to said graphic and character circuits, for assigning the tool numbers inside said graphic pattern on the basis of output signals from said graphic and character circuits, and outputting a signal; and
   a CRT display, operatively connected to said display control circuit, for displaying said graphic pattern and the tool numbers on the basis of the output signal from said display control circuit.

3. A tool display system of an automatic tool changing apparatus according to claim 1, wherein said memory for storing tool information is provided in a programmable controller.

4. A tool display system of an automatic tool changing apparatus according to claim 1, wherein said memory for storing tool information is provided in a numerical control unit.

5. A tool display system of an automatic tool changing apparatus according to claim 1, further comprising a spindle generating spindle position information, wherein said display unit displays a graphic representation of said spindle position information as well as information indicative of a tool mounted on said spindle.

* * * * *